(12) United States Patent
Sweeney et al.

(10) Patent No.: US 8,259,432 B2
(45) Date of Patent: Sep. 4, 2012

(54) CAPACITORS USING PREFORMED DIELECTRIC

(75) Inventors: Daniel C. Sweeney, Burbank, CA (US); John B. Read, San Diego, CA (US)

(73) Assignee: Space Charge, LLC, Aspen, CO (US)

( * ) Notice: Subject to any disclaimer, the term of this patent is extended or adjusted under 35 U.S.C. 154(b) by 289 days.

(21) Appl. No.: 12/698,899

(22) Filed: Feb. 2, 2010

(65) Prior Publication Data
US 2010/0226066 A1    Sep. 9, 2010

Related U.S. Application Data

(60) Provisional application No. 61/206,677, filed on Feb. 2, 2009, provisional application No. 61/223,688, filed on Jul. 7, 2009, provisional application No. 61/254,903, filed on Oct. 26, 2009.

(51) Int. Cl.
*H01G 4/008* (2006.01)

(52) U.S. Cl. ........ 361/305; 361/311; 361/312; 361/313; 361/502; 361/512

(58) Field of Classification Search .......... 361/305, 361/309–313, 502–504, 509–512, 516–519, 361/523–525, 303
See application file for complete search history.

(56) References Cited

U.S. PATENT DOCUMENTS

| | | | |
|---|---|---|---|
| 4,089,813 A | 5/1978 | Alexander | |
| 5,062,025 A | 10/1991 | Verhoeven et al. | |
| 5,337,209 A | 8/1994 | Sutherland et al. | |
| 5,486,277 A * | 1/1996 | Barbee et al. | 204/192.15 |
| 5,623,724 A | 4/1997 | Gurkovich et al. | |
| 5,688,724 A | 11/1997 | Yoon et al. | |
| 5,742,471 A | 4/1998 | Barbee, Jr. et al. | |
| 5,986,876 A | 11/1999 | Stepanov et al. | |
| 6,015,986 A | 1/2000 | Schuegraf | |
| 6,143,597 A | 11/2000 | Akihiro et al. | |
| 6,243,254 B1 | 6/2001 | Wada et al. | |
| 6,292,355 B1 | 9/2001 | Kang et al. | |
| 6,544,651 B2 | 4/2003 | Wong et al. | |
| 6,690,572 B2 | 2/2004 | Leibowitz | |
| 6,700,145 B1 * | 3/2004 | Black et al. | 257/295 |
| 6,819,540 B2 | 11/2004 | Allen et al. | |
| 6,881,377 B2 | 4/2005 | Katayama et al. | |
| 6,897,160 B2 | 5/2005 | Derderian et al. | |

(Continued)

FOREIGN PATENT DOCUMENTS

JP    2007-145634 A    6/2007

(Continued)

OTHER PUBLICATIONS

Bakhoum, Ezzat G. et al., "Electrophoretic coating of carbon nanotubes for high energy-density capacitor applications," Journal of Applied Physics 105, 104314, May 27, 2009, 6 pages.

(Continued)

*Primary Examiner* — Nguyen T Ha
(74) *Attorney, Agent, or Firm* — Kilpatrick Townsend & Stockton LLP

(57) ABSTRACT

Devices for storing energy at a high density are described. The devices include a solid dielectric that is preformed to present a high exposed area onto which an electrode is formed. The dielectric material has a high dielectric constant (high relative permittivity) and a high breakdown voltage, allowing a high voltage difference between paired electrodes to effect a high stored energy density.

21 Claims, 6 Drawing Sheets

U.S. PATENT DOCUMENTS

| | | |
|---|---|---|
| 6,978,494 B2 | 12/2005 | Wu |
| 7,023,687 B2 | 4/2006 | Sterzel et al. |
| 7,033,406 B2 | 4/2006 | Weir et al. |
| 7,057,881 B2 | 6/2006 | Chow et al. |
| 7,061,749 B2 | 6/2006 | Liu et al. |
| 7,190,016 B2 | 3/2007 | Cahalen et al. |
| 7,199,997 B1 | 4/2007 | Lipka et al. |
| 7,312,596 B2 | 12/2007 | Bolz et al. |
| 7,397,650 B2 | 7/2008 | Sato et al. |
| 7,405,922 B2 | 7/2008 | Kawaguchi et al. |
| 7,428,137 B2 | 9/2008 | Dowgiallo, Jr. |
| 7,465,497 B2 | 12/2008 | Tan et al. |
| 7,466,536 B1 | 12/2008 | Weir et al. |
| 7,486,498 B2 | 2/2009 | Welsch et al. |
| 7,567,426 B2 | 7/2009 | Ko et al. |
| 7,609,504 B2 | 10/2009 | Park et al. |
| 7,623,340 B1 | 11/2009 | Song et al. |
| 7,646,588 B2 | 1/2010 | Miyahara et al. |
| 7,672,114 B1 | 3/2010 | Long et al. |
| 7,691,533 B2 | 4/2010 | Sano et al. |
| 7,710,709 B2 | 5/2010 | Min et al. |
| 7,795,663 B2 | 9/2010 | Suh et al. |
| 7,813,108 B2 | 10/2010 | Liu et al. |
| 2002/0045313 A1 | 4/2002 | Lowrey et al. |
| 2003/0128496 A1 | 7/2003 | Allen et al. |
| 2004/0175586 A1 | 9/2004 | Raaijmakers et al. |
| 2005/0117272 A1 | 6/2005 | Koutsaroff et al. |
| 2005/0194628 A1 | 9/2005 | Kellar et al. |
| 2006/0022304 A1 | 2/2006 | Rzeznik |
| 2007/0111460 A1 | 5/2007 | Mosley et al. |
| 2007/0178227 A1 | 8/2007 | Hunt et al. |
| 2008/0030921 A1 | 2/2008 | Kaneda et al. |
| 2008/0087930 A1 | 4/2008 | Lee et al. |
| 2008/0158779 A1 | 7/2008 | Lin et al. |
| 2008/0192407 A1 | 8/2008 | Wen et al. |
| 2008/0225464 A1 | 9/2008 | Lashmore |
| 2008/0257588 A1 | 10/2008 | Naohiko et al. |
| 2008/0316678 A1 | 12/2008 | Ehrenberg et al. |
| 2010/0008021 A1 | 1/2010 | Hu et al. |

FOREIGN PATENT DOCUMENTS

| | | |
|---|---|---|
| JP | 2008-210723 A | 9/2008 |
| KR | 10-0461966 B1 | 12/2004 |
| WO | WO 01-95378 A2 | 12/2001 |
| WO | WO 2007-008920 A2 | 1/2007 |
| WO | WO 2008-052561 A1 | 5/2008 |
| WO | WO 2010-087993 A2 | 8/2010 |

OTHER PUBLICATIONS

Dang, Z.-M. et al., "Dielectric behavior of novel three-phase MWNTs/BaTiO3/PVDF composites," Materials Science & Engineering B103, 2003, pp. 140-144.

Furukawa, Jun et al., "Development of the UltraBattery for Micro- and Medium-HEV Applications," Presented at the joint international meeting of: 214$^{th}$ Meeting of ECS—The Electrochemical Society and 2008 Fall Meeting of the Electrochemical Society of Japan, Oct. 15, 2008, 1 page.

Jiang, Zibo. "Technology Assessment and Market Analysis of Solid State Ultracapacitors," United Kingdom, Masters of Engineering in Materials Science and Engineering Thesis, Massachusetts Institute of Technology, Sep. 2007, 98 pages.

Kaur, Dalveer et al., "Processing, dielectric behavior and conductivity of some complex tungsten-bronze dielectric ceramics," Journal of Ceramic Processing Research, 2006, pp. 31-36, vol. 7, No. 1.

Kelly, David, "Overview of the New Energy Storage Technology," 1st Lighten the Load Inc., Mar. 20, 2009, 30 pages.

Knowles, Timothy, "Carbon Velvet Cathodes: NRL Workshop on Cathodes for Relativistic Electron Beams," ESLI Materials & Processing, May 10, 2001, 13 pages.

Koontz, Slac R. et al., "High Dielectric Constant Materials for Pulshed Energy Storage Capacitors," IEEE, copyright 1998, pp. 23-26.

Kraft, Alexander, "Doped Diamond: a Compact Review on a New, Versatile Electrode Material," International Journal of Electrochemical Science, May 2007, pp. 355-385, vol. 2.

Lam, L. T. et al., "Development of ultra-battery for hybrid-electric vehicle applications," Journal of Power Sources 158, May 2, 2006, pp. 1140-1148.

Lawless W. N., "White Paper Capacitive Energy Storage At 77K," CeramPhysics, Inc., Oct. 29, 2003, 9 pages.

MacDougall, Frederick W. et al., "The Impact of Metallized Electrodes on High Energy Density Pulse Power Capacitors," Presented at the 13th Capacitor and Resistor Technology Symposium CARTS '93, Mar. 10, 1993, 6 pages, Costa Mesa, CA.

Moulson, A. J. et al., "Electroceramics Second Edition Materials Properties Applications," Wiley, Copyright 2003, 576 pages.

Tomer, V. et al., "High- and low-field dielectric characteristics of dielectrophoretically aligned ceramic/polymer nanocomposites," Journal of Applied Physics 103, 034115, Feb. 13, 2008, 7 pages.

Tomer, V. et al., "High field dielectric properties of anisotropic polymer-ceramic composites," Journal of Applied Physics 104, 074106, Oct. 6, 2008, 7 pages.

Wadley, Haydn N. G. et al., "Emerging Concepts for Synthesis of Thermally Engineered Materials and Structures," ONR Workshop, May 30-Jun. 1, 2001, 55 pages, Cambridge UK.

Choi, "Nano World: Carbon Nanotube Capacitors," Space Daily, Feb. 3, 2006, 2 pages.

International Search Report in PCT Application No. US2010/022926, mailed Aug. 17, 2010, 3 pages.

International Search Report in PCT Application No. U52010/022925, mailed Aug. 13, 2010, 3 pages.

International Search Report in PCT Application No. US2010/022923, mailed Aug. 26, 2010, 3 pages.

Nedo, Carbon Nanotube Capacitor Development Project, Copyright New Energy and Industrial Technology Development Organization, downloaded Nov. 24, 2010, 1 page.

\* cited by examiner

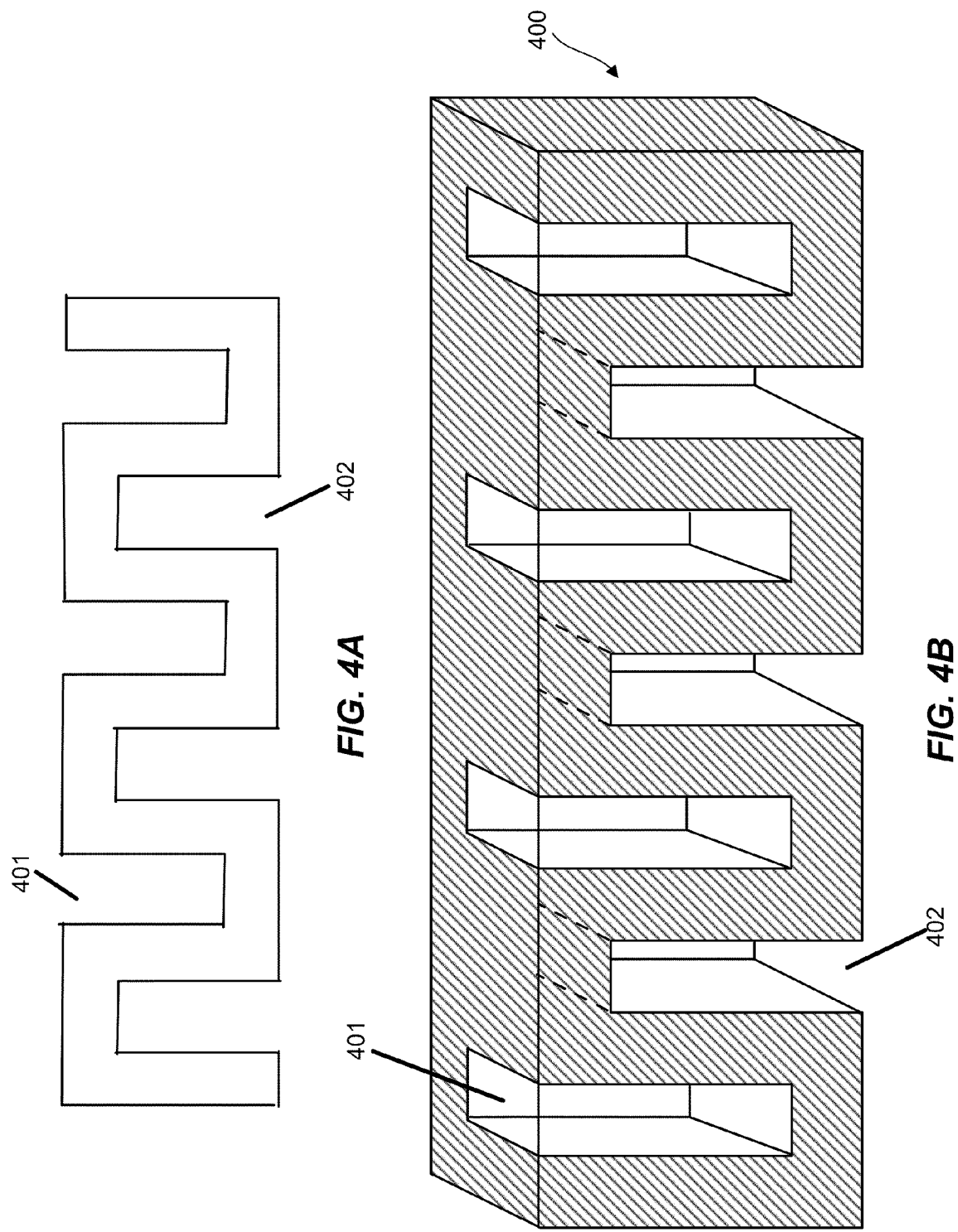

CAPACITORS USING PREFORMED DIELECTRIC

CROSS-REFERENCES TO RELATED APPLICATIONS

This application claims the benefit of U.S. Prov. Pat. App. No. 61/206,677 filed Feb. 2, 2009, and titled "METHOD AND APPARATUS FOR UTILIZING A HIGH VOLTAGE CAPACITOR BANK AS A SOURCE OF SUSTAINED LOW VOLTAGE ELECTRICAL CURRENT," U.S. Prov. Pat. App. No. 61/223,688 filed Jul. 7, 2009, and titled "HIGH-VOLTAGE CAPACITOR SOURCE," and U.S. Prov. Pat. App. No. 61/254,903 filed Oct. 26, 2009, and titled "HIGH-VOLTAGE CAPACITOR SOURCE." The entire contents of all these applications are incorporated herein by reference for all purposes.

FIELD

This application relates to high energy density storage systems, components and manufacturing methods.

BACKGROUND

Capacitive interaction occurs in all electronic circuits. Accordingly, discrete capacitors are included in the circuits to fulfill a variety of roles including frequency filtration, impedance matching and the production of electrical pulses and repetitive signals. Regardless of the complexity of the design, a capacitor can be thought of as two closely spaced conducting plates which may have equal and opposite charges ($\pm Q$) residing on them when a voltage (V) is applied. The scalar quantity called capacitance (C) is the ratio of the charge to the applied voltage. When capacitance increases, a significant charge can be stored and the device can be used like a battery.

Though common batteries have a high energy density, they can only deliver a relatively small current since the current must be generated by a chemical reaction occurring within each storage cell. By contrast, capacitors may have a low energy density but can discharge very quickly—a flexibility which is desirable for many applications. Superconducting magnetic energy storage (SMES) is an alternative, but still suffers from a low storage density combined with impractical mass and thermal complexities.

FIGS. 1A-1C show prior art capacitor designs. FIG. 1A shows a capacitor having electrical leads connected to conducting plates or electrodes 110. An air-gap 115-1 is left between electrodes 110 so that when a voltage is applied, a positive charge accumulates on the electrode with a positive bias. This results in an opposite charge on the other electrode and an electric field pointing from left to right in FIG. 1A. Each of the capacitors depicted in FIGS. 1A-1C is symmetric, i.e. possesses the same capacitance regardless of which electrode receives the positive voltage.

In FIG. 1B, the same capacitor has a dielectric material inserted in the space 115-2 between the electrodes 110. The dielectric constant or relative permittivity of the dielectric material allows the amount of charge (the "capacity" or capacitance of the capacitor) stored on each electrode to increase for the same applied voltage. A higher relative permittivity increases the ability of the dielectric to adjust its distribution of charge in response to the applied voltage; a negative charge accumulates near the positive electrode and a positive charge near the negative electrode. A smaller electric field exists between the electrodes if the relative permittivity is higher.

The stored charge can be further increased by using an electric double-layer capacitor (EDLC) design. EDLC's have higher energy density than traditional capacitors and are sometimes referred to as "supercapacitors". Energy density can be defined as the amount of charge stored per unit volume. However, the storage density of EDLC's (depicted in FIG. 1C) can still be improved upon. Between electrodes 110, a dielectric material 116 surrounds high surface area electrically-conducting granules 117 distributed in the gap 115-3. A dielectric separator 118 is positioned between two regions of the embedded granules 117. The surfaces of granules 117 on the left of separator 118 are positively charged while the granules 117 on the right develop negative surface charging. The effective surface area of the capacitor is increased which allows even more charge to be stored on electrodes 110 for a given voltage.

Despite these advances, further increases in energy storage density of capacitors may improve upon traditional batteries.

BRIEF SUMMARY

Devices for storing energy at a high density are described. The devices include a solid dielectric preformed to present a high exposed area onto which an electrode is formed. The dielectric material has a high dielectric constant (high relative permittivity) and a high breakdown voltage, allowing a high voltage difference between paired electrodes to effect a high stored energy density.

Additional embodiments and features are set forth in part in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

FIG. 4A-4D are views of a multi-layer stacked high-voltage storage capacitor according to disclosed embodiments.

Figure 1A:
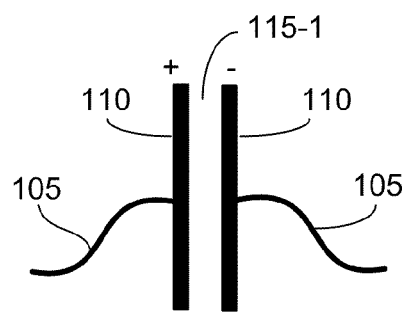
FIGS. 1A-1C are schematics of prior art capacitors.
Figure 1B:
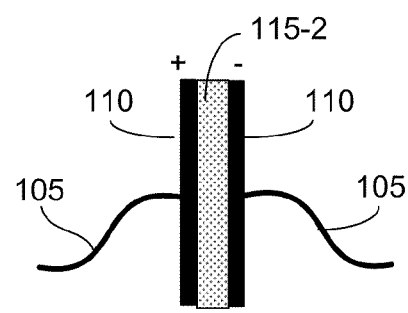
Figure 1C:
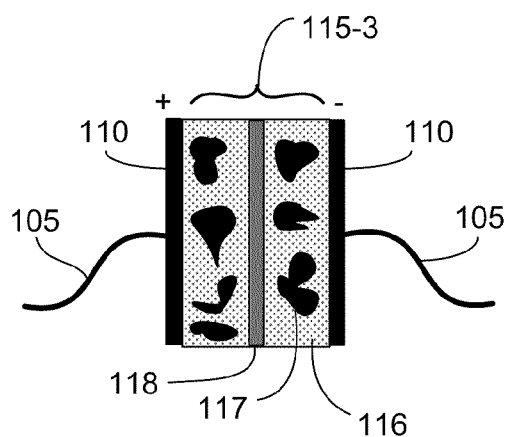

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Devices for storing energy at a high density are described. The devices include a solid dielectric preformed to present a high exposed area onto which an electrode is formed. The dielectric material has a high dielectric constant (high relative permittivity) and a high breakdown voltage, allowing a high voltage difference between paired electrodes to effect a high stored energy density.

The quantity of energy stored in a capacitor is proportional to the capacitance. Capacitance is proportional to the contact area between the dielectric material and the electrodes as well as the effective relative permittivity of the dielectric material between the two electrodes. The electric double-layer capacitor (EDLC) described above owes its relatively high energy storage capacity to an increased effective surface area of the electrodes which creates increased capacitance. However, the EDLC design is not conducive to operation at elevated voltages since the electric fields can become high enough to result in a breakdown of the dielectric material. In some embodiments, energy storage density and capacity can be improved by increasing the voltage across the electrodes. This is because the storage capacity is proportional to the square of the voltage, making this an even more attractive parameter to increase when possible. For example, an increase in voltage potential across a capacitor from about 1 volt (V) to about 100V increases the storage capacity of the device by a factor of 10,000. Accordingly, capacitors which allow the charging voltage to increase may rival storage battery energy densities while still allowing high output power to be generated.

To further improve energy storage capacity, the surface area between the dielectric and electrode can be maximized. In one embodiment, the formation of electrodes with increased surface area through texturing is utilized. However, the process can be difficult due to the brittle structure of the electrodes as well as wetting problems when a flowable dielectric is flowed into the region between the two electrodes. In some embodiments, the dielectric may be solidified in the region between the two electrodes. However due to the properties of the dielectric, the volume of the dielectric decreases, creating decreased surface area between the dielectric and the electrodes. Alternatively, forming the dielectric with a textured and increased surface area can take into account for this shrinkage. Accordingly, another embodiment is the formation of the dielectric into a high surface area structure. The preformed dielectric may include one or more textured surfaces on which the conductive materials are then deposited. The conductive materials form the electrodes and create a potential across the dielectric material structure.

High storage capacitors made by texturing the surfaces of a dielectric structure and depositing the conducting electrode material onto the textured surfaces are described herein. In such embodiments, the dielectric structure is used to determine the physical configuration of the electrodes and capacitor. In the case of more brittle ceramic plates, the dielectric structure should be made as thin as possible while still providing physical support over a span of several centimeters. The thickness of the dielectric structure may range from 2 millimeters down to 0.5 mm in most embodiments. Maintaining thin dielectric structures allows high capacitive storage without requiring excessive operating voltages.

A dielectric material structure with a high relative permittivity and high breakdown field when positioned between electrodes is preferable. The high relative permittivity may be above or about 500, above or about 1000, above or about 2000, above or about 5000, above or about 10000 or above or about 20000 in various embodiments. The breakdown voltage of assembled devices may be above or about 1 kilovolt (kV), above or about 2 kV or above or about 4 kV in various embodiments. Having a high breakdown voltage is important because, once a higher voltage is reached, the linearity of the capacitor decreases. In some cases, high voltages can even deform the structure of the capacitor.

Suitable ultra-high permittivity dielectric materials for the dielectric structure are perovskite materials, which exhibit both ferroelectric and piezoelectric properties. These mixtures may be granular and include materials of various grain sizes. For example, barium titanate and strontium nitrate mixtures of medium grain size exhibit permittivities above or about 2000 and have a dielectric strength (e.g., breakdown voltage) of about 2 kilovolts per millimeter (kv/mm). Another example includes a mixture of barium titanate and strontium titanate of large grain size, which exhibits permittivity above or about 5000. In general, the larger the grain size, the larger the permittivity due to oxidized outer layers having high dielectric strength. Moderate grain sizes may include a grain being 1 micrometer in diameter, whereas larger grains sizes may include a grain being 10-20 micrometers in diameter. However, forming dielectric structures with larger grain sizes is more difficult. Another embodiment includes a barium titante and strontium titanate mixture of submicron grain sizes. The mixture of nano-powders can be further mixed with high dielectric polymers.

Other ultra-high permittivity dielectric materials include tungsten bronze ferroelectric crystals. These crystals may be combined with dielectric glass, which is subsequently melted at ultra-high temperatures to form the dielectric structure. Tungsten bronze structures exhibit permittivity ranging between 2,000 and 8,000 and dielectric strength around 80 kV/mm.

Figure 2:
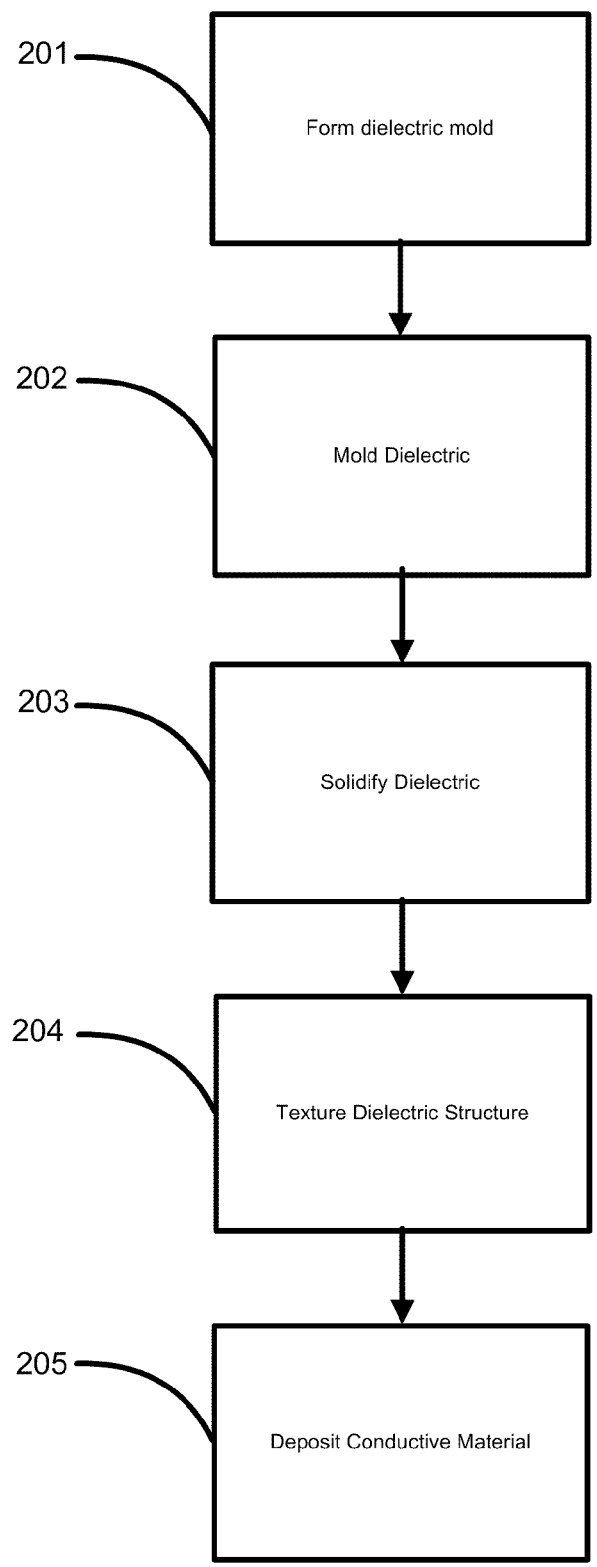
FIG. 2 is a flowchart of a method for forming a high-voltage storage capacitor according to disclosed embodiments.

FIG. 2 provides a flow diagram for the process of making a high storage capacitor through a performed a dielectric structure. The process may include several variations in the sequence of steps provided in this embodiment. First, in step 201, a mold is made to form the dielectric structure. In step 202, the dielectric material is molded into the desired structure. In step 203, the dielectric structure is solidified. In step 204, the dielectric is textured. Finally, in step 205, a conducting material, such as a malleable metal in vapor or liquid form, is deposited onto the preformed dielectric structure to form the electrodes. Electrodes of opposing charges may then be connected to leads to form a high energy storage capacitor. Various embodiments of the aforementioned steps are described further in detail in the following paragraphs, with reference to exemplary embodiments illustrated in FIGS. 3A-3C and FIGS. 4A-4C.

Referring to FIG. 2, in step 201, a dielectric mold is made for the dielectric. The mold may be utilized to form a basic, geometric dielectric structure, such as a blank. The dielectric blank may be further textured at a later point to increase surface area. Alternatively, the mold may provide the final form of the dielectric structure in some embodiments. The mold may also be utilized to pre-form the dielectric structure in a two stage firing process. In such an embodiment, the mold may be a soft mold, made through lithography in etched rubber material. After the desired mold is made, the dielectric is injected for formation.

In general, moldable dielectrics may have a flow-enabling component which allows the material to be poured and exhibit fluid like characteristics. As mentioned in previous paragraphs, this may also be due to the granular structure of the compositions in the mixture. The dielectric may be formed by grinding high relative permittivity material into granules and introducing the granules into a liquid. This solution may be referred to as a slurry, and may contain crystals, binders and carrier fluids to promote flowability. The binders fluids may be any fluid able to bond the dielectric together under firing. Most binder fluids contain alcohol mixtures, though these types of fluid exhibit increased shrinkage during curing. Other binder fluids may include a hydrocarbon polymer, or a glass, such as soda glass, having a low melting point.

Referring now to FIG. 2, in step 202, the slurry may be injected in a mold to form the dielectric structure. In some embodiments, the mold may be used to form the dielectric structure into a blank, which may be later be textured, or may be used to form the textured dielectric structure itself. However, forming the textured dielectric structure directly from a mold may create design problems due to shrinkage during the solidification process.

The dielectric can be solidified by any number of processes, including firing, which is further explained in the following paragraphs. The liquid dielectric and the solid granules will likely have different relative permittivities. Typically, the liquid material exhibits a lower permittivity and the solid granules exhibit a higher permittivity. The combined or effective permittivity of the formed structure depends on both permittivities, displaying a value between the lower and higher permittivities.

In the case of molding the dielectric, the slurry may be a viscous paste that solidifies after be poured into the mold to form the textured dielectric structure. The solidification process can take place in two stages to ensure that the dielectric will display the requisite electrical properties. One stage of solidification may result from simply waiting for the flow-enabling additive to evaporate from the material or the dielectric structure may be actively cured by shining light (e.g. ultraviolet light), raising the temperature (annealing), irradiating with an e-beam and/or similar processes known to those of skill in the art. Molten dielectric may solidify simply by cooling to a temperature below the melting temperature of the dielectric. After the first solidification, the textured dielectric structure is formed and with little volume loss.

Referring again to FIG. 2, in step 203, the dielectric may be fired at a second stage in the solidification process. The firing process is similar to baking the dielectric structure, heating the structure to near its melting point in order to further solidify the dielectric structure and promote bonding between the composition materials. During the second firing stage the volume of the dielectric decreases up to ten percent or more of its original form. Shrinkage in dielectric structures made from ceramic materials, such as green ceramic, usually occurs uniformly.

The second stage of firing is typically done before the electrode is deposited since the metallic electrode is often eutectic when the dielectric is providing the structure of the capacitor. Firing the dielectric structure may also promote the bond between the electrode and the dielectric and increase the electrical permittivity of many dielectrics. Firing before depositing electrode is also desirable to provide rounded features, so the completed structure is not prone to sparking or electrical discharge. For some geometries, it may be necessary to fire the dielectric before forming the texture since the texturing may be lost in the firing process. This is especially true for extremely small features produced lithographically or when using matrix-assisted pulsed laser deposition (MAPLE).

In other embodiments, the firing and molding processes may occur simultaneously, such as micro-ceramic injection molding. The slurry is heated under pressure to form the molded dielectric structure. In this case, the mold may be the furnace as well as the part-forming press. In alternative embodiments, tooling is produced to accept the slurry. In one embodiment, the slurry is made from soda glass and heated to a low temperature to melt the glass and form a flowable dielectric mixtures. Once injected into the mold, the mixture cools and assumes final form. In another embodiment, soft lithography may also be utilized as a form of micro-injection molding, with a first low temperature heating of the slurry for solidification in a lithographically-formed synthetic rubber mold, and a second stage of higher temperature heating after being removed from the mold. This allows the dielectric structure to be both molded and textured collectively with uniform shrinkage on the surface. Temperature uniformity across the mold, as well as accurate temperature control, is important for this manufacturing technique and can allow minimal shrinkage during the solidification process.

In another embodiment, micro-thin tape may be impregnated with electro-ceramic materials and then be layered into various patterns. The tape acts as the mold of the dielectric and may be cut into various two dimensional patterns. However, the stacks of tape create three dimensional internal structures. After firing, the tape disintegrates, leaving only the electro-ceramic material, which forms a three dimensional, high surface area dielectric structure.

Referring back to FIG. 2, at step 204, the dielectric structure may be textured after molding. The texturing process can involve one or a combination of techniques. As discussed above, these texturing techniques may occur prior to or during the firing process, such as with micro-injection molding and electro-ceramic impregnated tape, molding or stamping texture into the dielectric prior to the first stage of firing, partially firing the ceramic in two stages and/or physically abrading or scouring the surface after firing. Micro-machining a formed dielectric blank may also be performed after the solidification process.

Accordingly, in one embodiment, the final dielectric structure is in the form of a blank, which is then textured. The blanks can be made into geometric structures, such as squares and rectangles. The blanks are then textured in numerous ways to create a high surface area for subsequent contact with the electrodes. Exemplary texturing techniques may include micro-machining channels into the blank. Subminiature drills, routers and similar milling devices may be utilized to form these channels. In general, the channels are separated in the range of above or about 10 to above or about 30 microns in order to ensure stability in the final dielectric structure. The channels may be made in two perpendicular directions through the blank in order to create intersecting channels, forming a grid-like internal structures in which surface area is maximized.

Figure 3A:
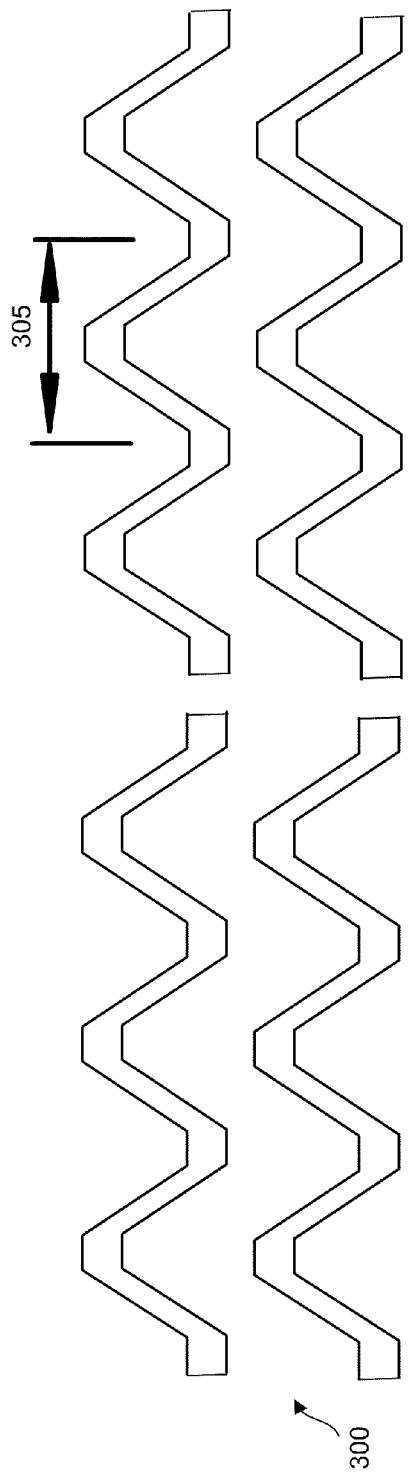
FIGS. 3A-C are views of a high-voltage storage capacitor according to disclosed embodiments.
Figure 3B:
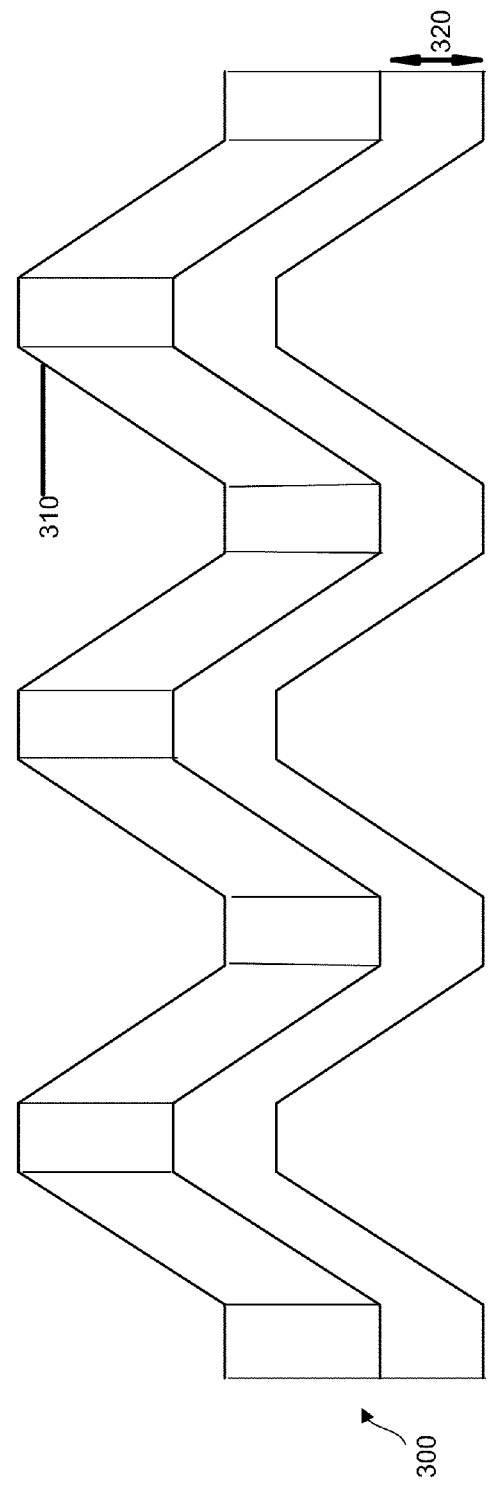
Figure 3C:
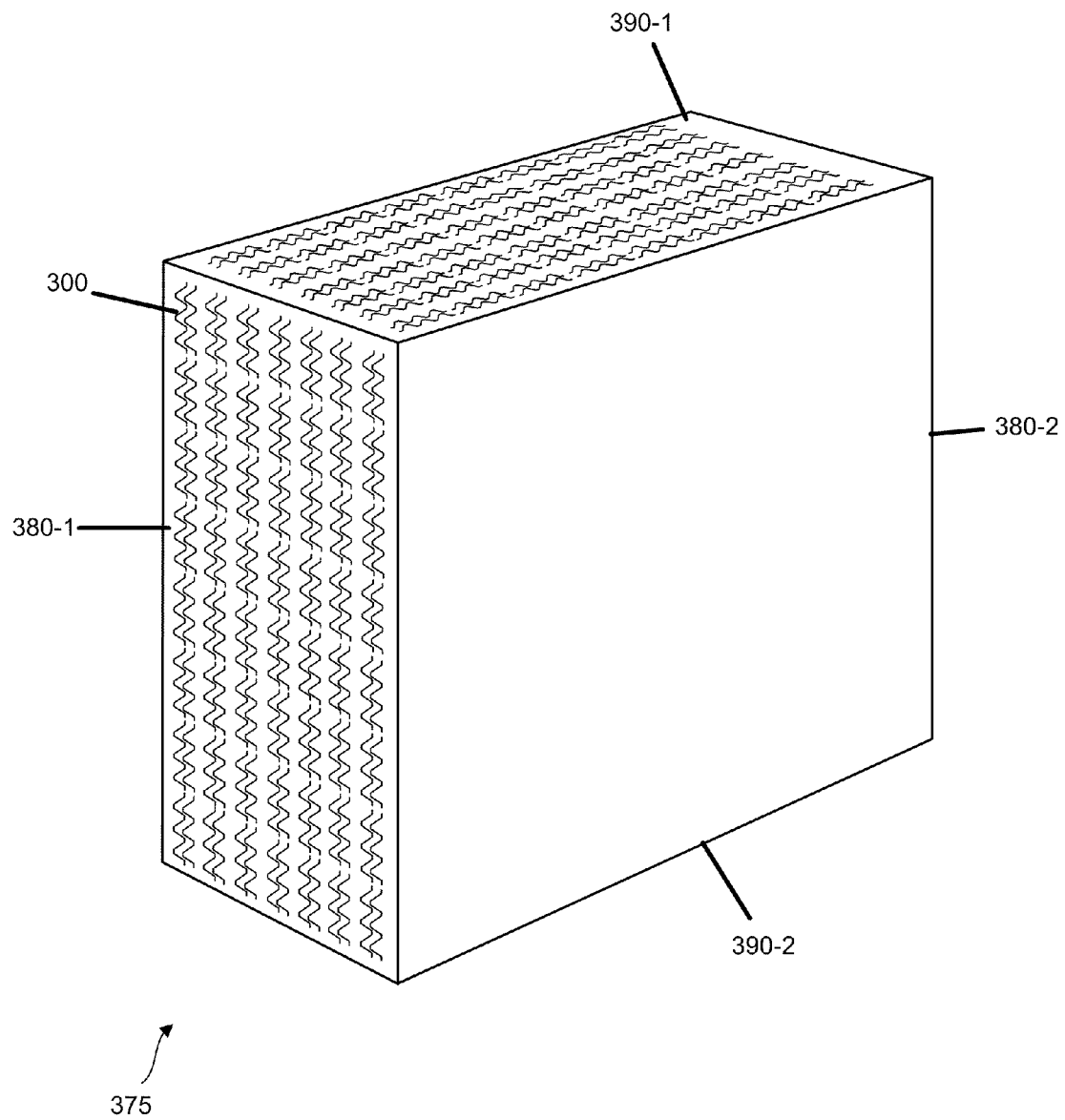

Referring now to FIGS. 3A-3C, an exemplary embodiment of a preformed dielectric structure is shown. In such an embodiment, a dielectric blank may be bored by a micromachining drill or may be formed in layers, utilizing one or more molds.

FIG. 3C illustrates the dielectric structure 375 in the form of a blank, which may be about 5 centimeters (cm) by 5 cm and 4 millimeters (mm) wide. Side-by-side corrugated channels 300 are bored through the blank from a first side 380-1 to a second side 380-2. Similar corrugated channels 300 are also bored through a third 390-1 and fourth side 390-2 in the same planes, creating perpendicular channels that intersect to form a waffle-iron pattern within the dielectric structure. The cross-hatched waffle-iron layer forms an electrode, where the corrugation is intentional texturing in excess of 10, 20, 30, or 50 micrometers in height.

As shown in FIGS. 3A-3C, each channels 300 may consist of approximately three corrugations 305, each set of three corrugations may be approximately 130 micrometers (microns) wide and approximately 30 microns in height (peak to peak). The peaks 310 of the pyramidal corrugations are flattened and approximately 10 microns in across. Further, the bored channel space 320 may be approximately 10 microns in thickness.

As shown in FIG. 3A, two pair of channels 300 are illustrated in plan view for one embodiment. Each pair having one electrode in the top channel and an opposing electrode in the bottom channel. The top and bottom channel in each pair may be separated by approximately 30 microns of dielectric, in order to ensure stability of the final dielectric structure in one embodiment. The pairs of channels 300 may be separated by approximately 30 microns both above, below and adjacent to one another. Approximately 300 channels may be aligned across the first side 380-1 of the dielectric structure and approximately 90 channels may be layered across the perpendicular third side 390-1 of the dielectric structure. Accordingly, approximately 27,000 electrode structures may be subsequently formed in the dielectric structure. With each electrode structure representing a surface area of approximately 0.05 cm squared ($cm^2$), the total surface area approaches 1350 $cm^2$ in the dielectric structure.

In another embodiment, the channels may span the length of the blank. In such an embodiment, the blank may be formed by molding multiple layers of the dielectric and subsequently layering conductive material between the dielectric preformed layers. The layered structure would then need to be bonded through firing or another bonding techniques. Spacers may be added within these layers in order to prevent charge leakage. Exemplary spacers may include a high dielectric strength polymer film separator, such as Kynar (PVDF).

Figure 4C:
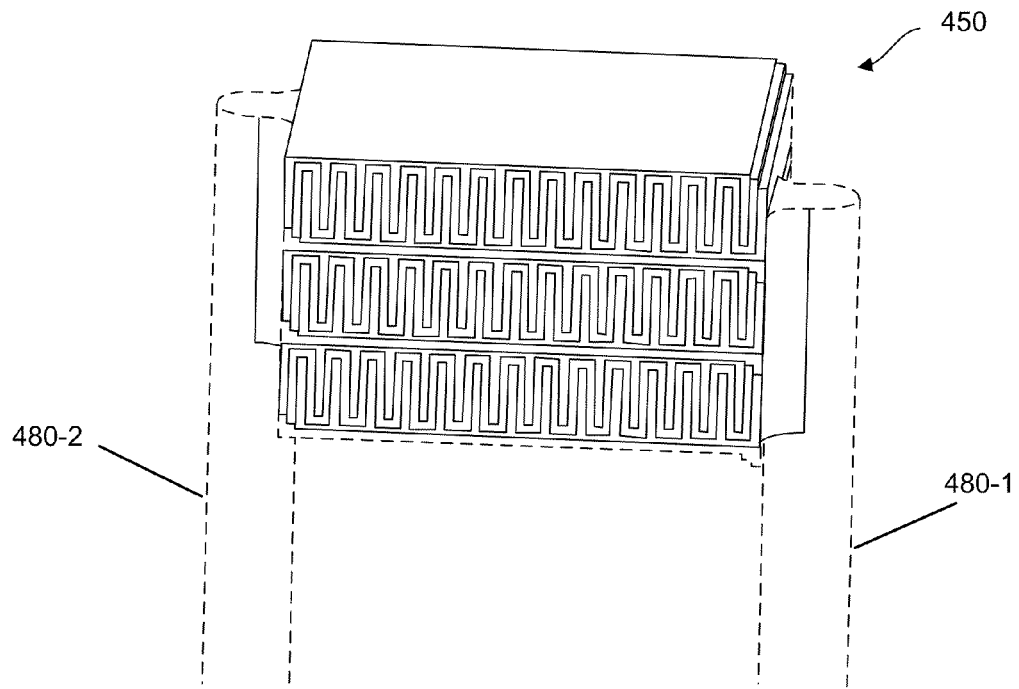
Figure 4D:
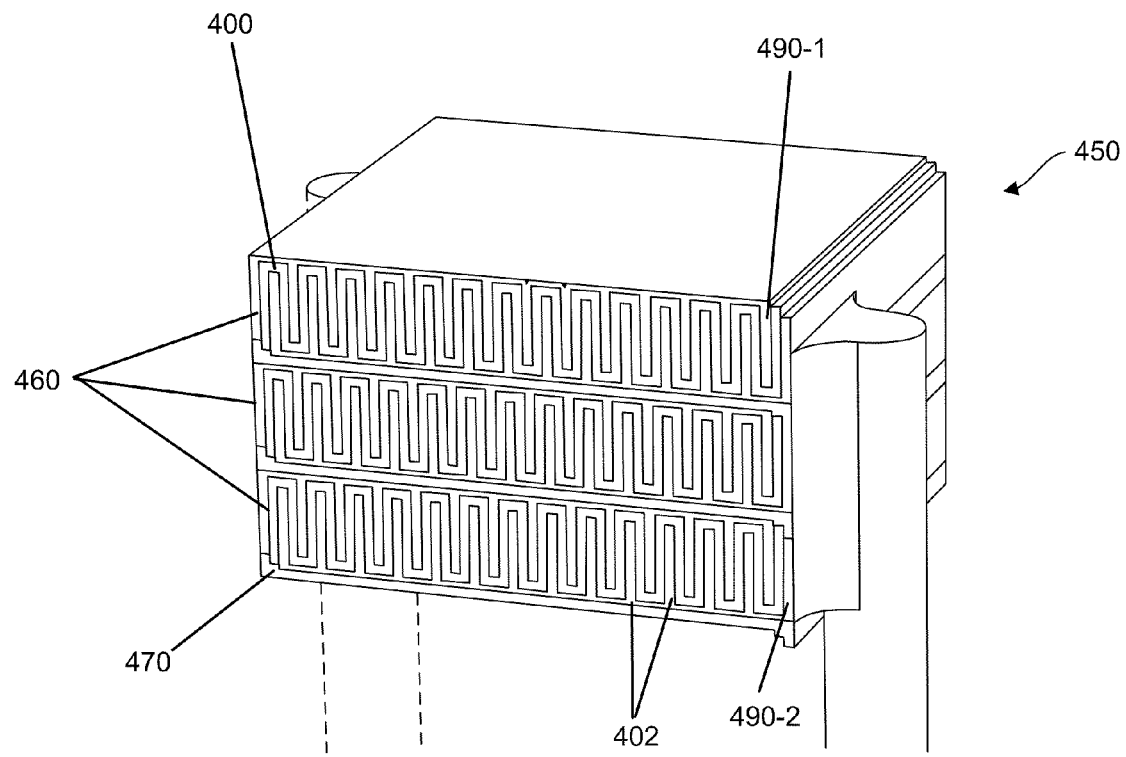

FIGS. 4A-4D illustrate another embodiment, having a rectangular geometry of preformed dielectric. In this embodiment, a dielectric blank 400 is carved with channels to include multiple slits 401, 402 both across the top and the bottom of the dielectric structure. As FIG. 4A shows a cross-sectional view of the channels created through the structure when the slits are carved is shown. FIG. 4B illustrates a three dimensional view of the formed dielectric structure. The slits 401, 402 may range from 10 to 20 microns wide and range from 10 to 160 microns in height. The rectangular dielectric structure forming the slits may range from 20 to 60 microns in width and 20 to 180 microns in height. The opposing electrodes are deposited within and above the top slits 401 and the bottom slits 402. Accordingly, pronged plate electrodes are formed after the dielectric is carved with slits. Referring to FIG. 4C-4D, the capacitor structure 450 may be stacked, having spacers 470 placed between each successive layer 460.

Referring back to FIG. 2, in step 205, the electrodes are formed by depositing a conductive material onto the dielectric structure in various ways. The conductive material may be in the form of liquid, vapor or fog and create a contact area between the conductive material such that the dielectric structures is substantially free from voids. In one embodiment, this may be done through evaporative techniques in an evacuated environment. In another embodiment, deposition from chemically active metal-containing precursors and/or exciting metal-containing precursors with an electromagnetically-induced plasma is performed. Other techniques may be utilized with low-melting-temperature metals (e.g. eutectic alloys), such as raising the temperature of the dielectric structure and melting the conductive material onto the dielectric structure. Low-melting-temperature metal may be provided in the form of a powder to further facilitate melting and forming a large surface area bond. In yet another technique, molten metals, such as silver, nickel, or platinum, may be poured over porous dielectric structures, percolating the pores and forming a juncture between the two materials. Exemplary porous dielectric materials for use in such an embodiment may include glass and tungsten bronze perovskite materials.

The conductive material of the electrode may also comprise a metallic textile. Metallic textiles may be made of a variety of metals generally chosen for their conductivity and ease of manufacture. Exemplary metallic textiles may comprise tin to enhance ductility and may be an alloy to maintain conductivity (example: copper (95%) tin (5%)). Metallic textiles may be sintered and calendered to improve conductivity and to ensure a compact, low aspect ratio structure in one embodiment. Sintering and calendering also helps to reduce sharp edges and high radius curves, properties which help to reduce the chance of electrical discharge between electrodes in some embodiments.

The conductive material may be a composition of several types of conductive materials and may exhibit multiple phase states in order to be deposited and solidified onto the dielectric structure. The conductive materials may be liquid metals, such as gallium indium tin, a polymer loaded with metal microspheres, a solder, a conductive polymer or a pure elemental metal. Examples include noble metals, refractory metals and specialized alloys such as silver, nickel, copper, platinum, tungsten, iridium, ruthenium, tantalum, monel, inconel, gallium indium tin, solder, and fecralloy. The conductive material preferably resists oxidation. Additional examples of non-oxidizing materials suitable for electrodes include carbon, graphene, and conductive resins and plastics.

Referring back to FIG. 3C, an exemplary embodiment of a capacitor including a preformed, bored dielectric structure is illustrated. In this structure, leads (not shown) may be connected to alternating sides of the dielectric blank, with each alternating, opposing electrode protruding on each side, or thorough lead lines across the sides of the dielectric.

In some embodiments, a capacitor may be formed from one or more layers of dielectric. Multiple dielectric structures may be layered with alternating and opposing electrodes in order increase capacitance. In the case of a multi-layer capacitor, they may be combined in series or in parallel depending on the application. In a parallel configuration, every other electrode is connected electrically.

In another embodiment, FIG. 4C-4D show different views of a high energy storage capacitor using electrodes layered with dielectric structures during assembly. Each post 480-1, 480-2, serves as a portion of an electrical lead and connects to alternating electrodes 490-1, 490-2, enhancing the energy storage of the completed device. The layers of the preformed dielectric structure 400 and electrode 490-1, 490-2 combinations are separated by spacer 470 to reduce electrical leakage between layers.

As previously discussed, electrodes 490-1, 490-2 of opposing charge are disposed in and above the top slits 401 and bottom slits 402 of the dielectric structure. As shown, each electrode structure creates a comb-like structures with an end plate with multiple tines within each slit 401, 402. Each tine creates a high contact area with the dielectric. Accordingly, surface area is maximized within the structure, allowing for increased energy storage of the capacitor in an embodiment.

Having disclosed several embodiments, it will be recognized by those of skill in the art that various modifications, alternative constructions, and equivalents may be used without departing from the spirit of the disclosed embodiments. Additionally, a number of well known processes and elements have not been described in order to avoid unnecessarily obscuring the present invention. While the principles of the disclosure have been described above in connection with specific apparatuses and methods, it is to be clearly understood that this description is made only by way of example and not as limitation on the scope of the disclosure.

As used herein and in the appended claims, the singular forms "a", "an", and "the" include plural referents unless the context clearly dictates otherwise. Thus, for example, reference to "a process" includes a plurality of such processes and reference to "the dielectric material" includes reference to one or more dielectric materials and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A storage capacitor comprising:
a dielectric structure having one or more intentionally textured surfaces having surface features in excess of 10 microns in height that is a flowable dielectric material molded into a dielectric structure, and converted into a solid dielectric structure, wherein:
the dielectric material has an effective relative permittivity greater than or about 500; and
two or more electrodes having a first electrode disposed on a first surface of the dielectric structure and a second electrode disposed on a second surface of the dielectric structure, wherein the second electrode is physically separated from the first electrode by the dielectric structure.

2. The storage capacitor of claim 1 wherein the dielectric material is a mixture of two or more dielectric materials.

3. The storage capacitor of claim 1, wherein the dielectric material is a perovskite material.

4. The storage capacitor of claim 1, wherein the dielectric material is flowable.

5. The storage capacitor of claim 1, wherein the dielectric material is sintered to form the dielectric structure.

6. The storage capacitor of claim 1, wherein the dielectric material is micro-injection molded to form the dielectric structure.

7. The storage capacitor of claim 1, wherein the dielectric material is micro-machined to form the dielectric structure.

8. The storage capacitor of claim 1, wherein the two or more electrodes are interleaved.

9. The storage capacitor of claim 1, wherein the two or more electrodes are geometrical in structure.

10. The storage capacitor of claim 1, wherein the two or more electrodes are tined.

11. The storage capacitor of claim 1, further comprising:
two or more layers, each layer having at least one dielectric structure and at least two electrodes.

12. The storage capacitor of claim 11, wherein the two or more layers are separated by spacers.

13. The storage capacitor of claim 1, wherein the two or more electrodes are connected to two or more leads.

14. A method of forming a storage capacitor, the method comprising:
providing a flowable dielectric material having a relative permittivity greater than or about 500;
pouring the flowable dielectric material into a mold;
forming the flowable dielectric into a dielectric structure, wherein the mold textures one or more surfaces of the dielectric material;
converting the dielectric structure into solid dielectric structure; and
depositing a conductive material onto the two or more textured surfaces of the dielectric material.

15. The method of claim 14, wherein the texturing one or more surfaces of the dielectric structure comprises micro-machining the dielectric material.

16. The method of claim 14, wherein the texturing one or more surfaces of the dielectric structure comprises micro-injection molding the dielectric material.

17. The method of claim 14, wherein the conductive material is flowable.

18. The method of claim 14, further comprising:
heating the formed dielectric structure to a first temperature; and
heating the formed dielectric structure to a second temperature.

19. The method of claim 14, wherein the converting the flowable dielectric to a solid dielectric comprises curing the flowable dielectric.

20. The method of claim 14, wherein the converting the dielectric structure into a solid dielectric structure comprises annealing the flowable dielectric.

21. The method of claim 14, wherein the converting the dielectric structure into a solid dielectric comprises irradiating the flowable dielectric with ultraviolet light.

* * * * *